United States Patent [19]
Sharp et al.

[11] 3,954,243
[45] May 4, 1976

[54] SUPPORT FASTENER

[75] Inventors: Larry L. Sharp, Schaumburg;
Joseph Smrz, Arlington Heights, both of Ill.

[73] Assignee: Illinois Tool Works Inc., Chicago, Ill.

[22] Filed: Mar. 7, 1974

[21] Appl. No.: 449,798

[52] U.S. Cl. ............................. 248/235; 248/223
[51] Int. Cl.² ..................................... F16M 13/00
[58] Field of Search.............. 248/73, 223, 220.5, 248/224, 225, 239; 403/329

[56] References Cited
UNITED STATES PATENTS

| | | | |
|---|---|---|---|
| 1,204,858 | 11/1916 | Gert | 248/73 |
| 2,498,842 | 2/1950 | Kuenne | 248/223 X |
| 2,542,753 | 2/1951 | DeSuart | 248/239 |
| 2,927,956 | 3/1966 | Reisch | 248/223 X |
| 3,414,686 | 12/1968 | Reinthaler | 403/329 X |
| 3,628,762 | 12/1971 | Williams | 248/223 X |

FOREIGN PATENTS OR APPLICATIONS

| | | | |
|---|---|---|---|
| 1,249,599 | 9/1967 | Germany | 248/223 |
| 6,413 | 3/1893 | United Kingdom | 248/223 |

*Primary Examiner*—William H. Schultz
*Attorney, Agent, or Firm*—Jack R. Halvorsen; Robert W. Beart

[57] ABSTRACT

A one piece plastic fastener for supporting secondary members relative to a thin panel in a shouldered non-circular aperture. The fastener provides a wide distribution of stress loading by a large hook-like prong which is rotated into contact with the backside of the panel by telescoping it through the aperture until the head covers the aperture. A resilient arm extends from the prong into engagement with the edge of the non-circular aperture to prevent unintentional retrograde motion of the fastener. The fastener can be removed, if desired, by introduction of a thin member under the head to unseat the resilient arm.

23 Claims, 25 Drawing Figures

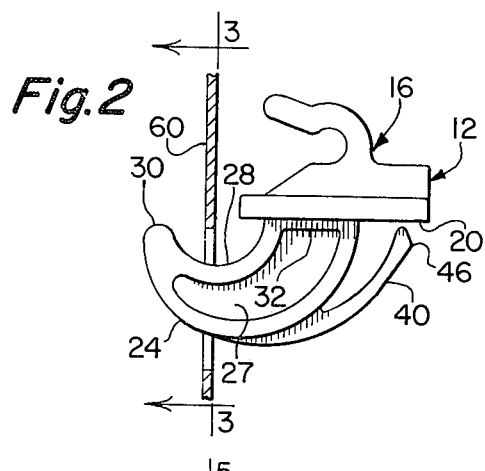
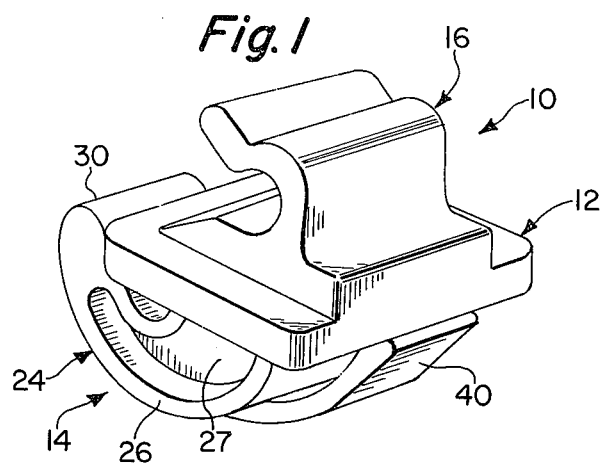
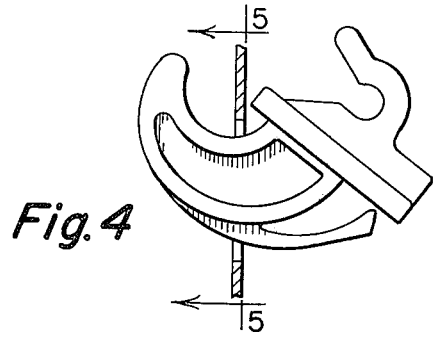
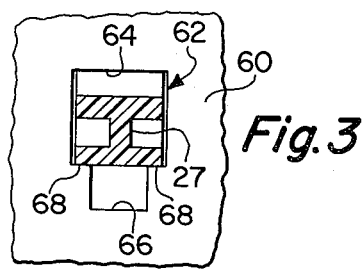
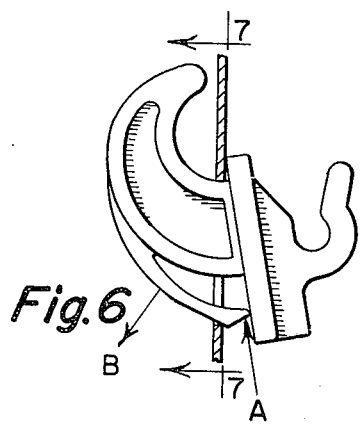
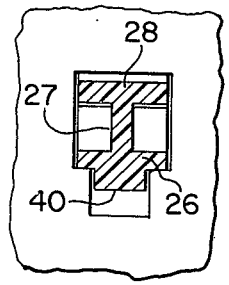
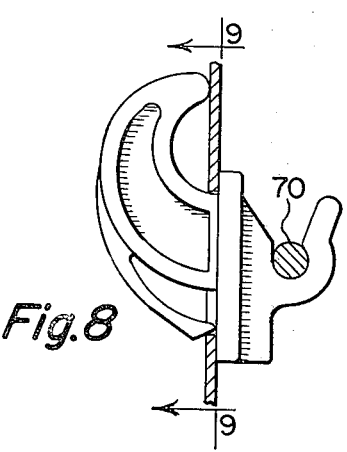
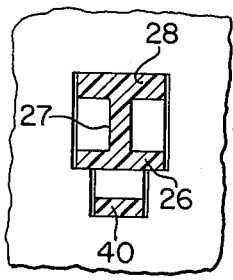
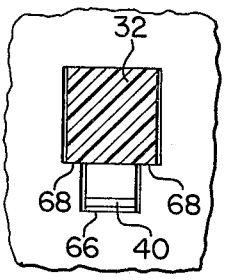

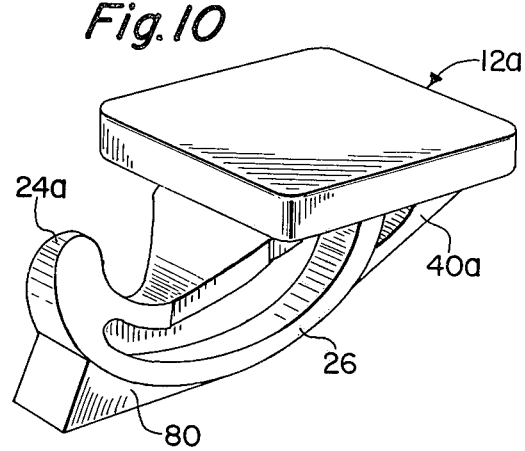
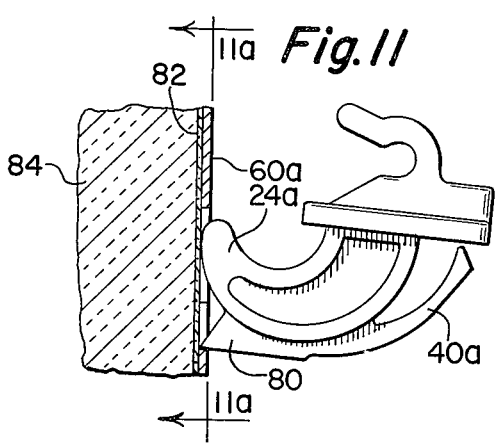
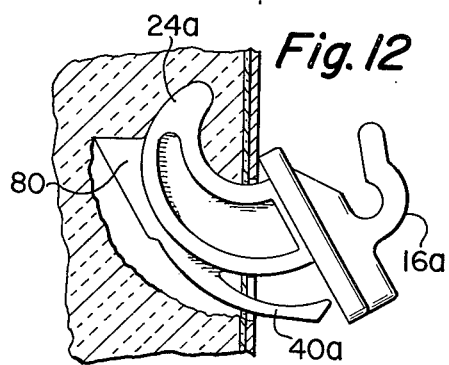
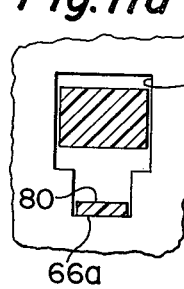
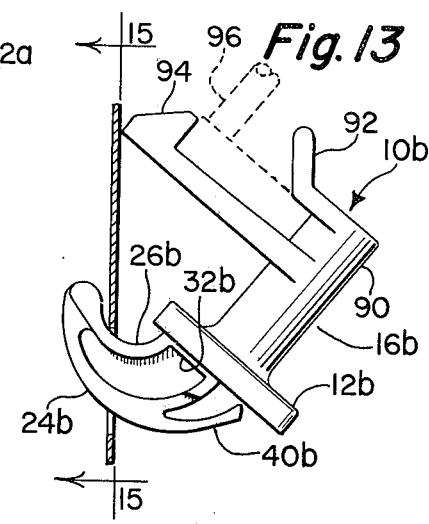
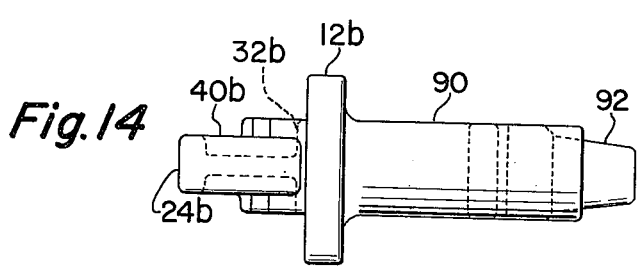
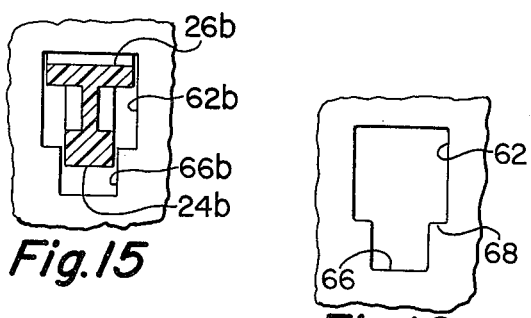
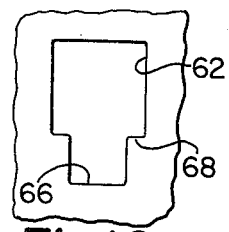
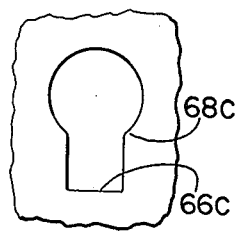
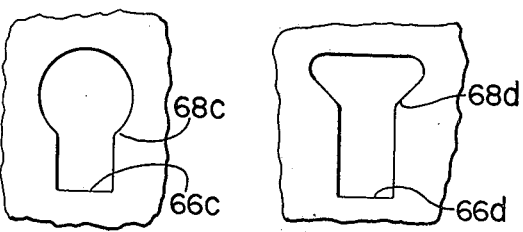
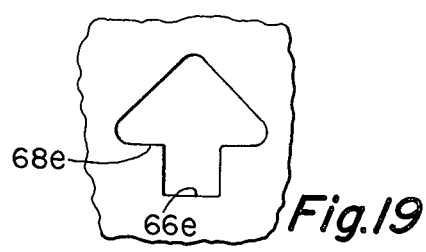
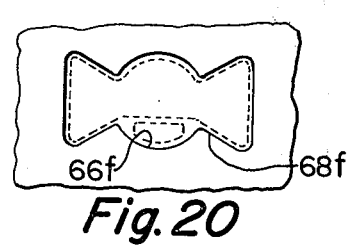

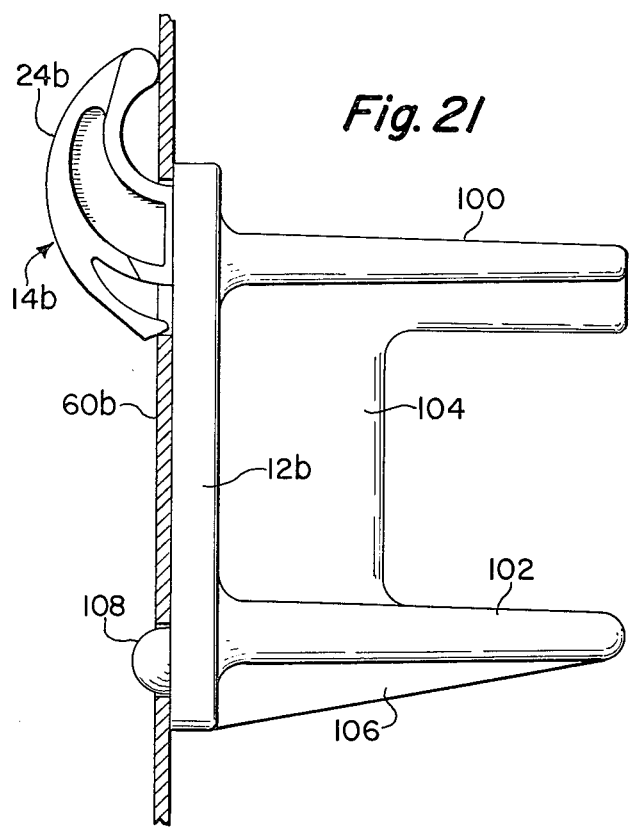
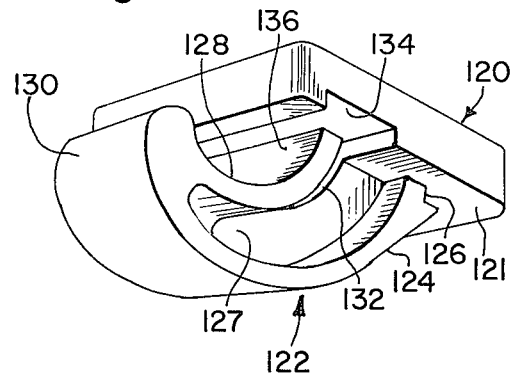
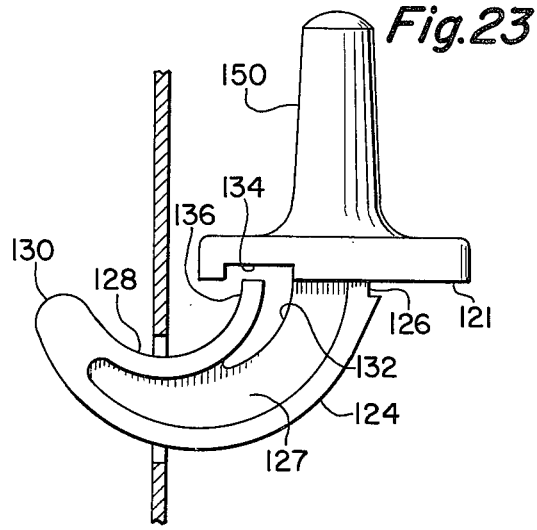
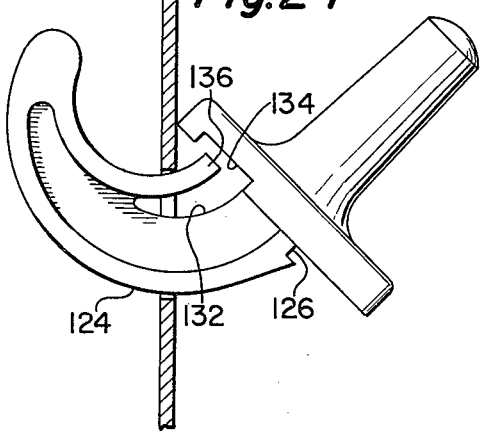
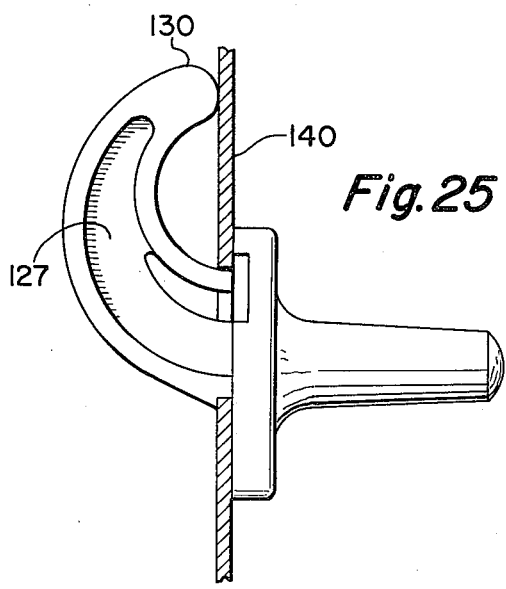

SUPPORT FASTENER

BACKGROUND OF THE INVENTION

Historically, latching types of brackets and hardware have been provided for fastening supports to wall sections and strips for the purpose of supporting shelves and other items in showcases, refrigerators, and generalized shelving such as is found in libraries. Devices of this type were initially complex and specialized with examples of such art being found in the following U.S. Pat. Nos.: G. C. Wright — Pat. No. 786,935; E. Melchior — Pat. No. 836,045; W. T. Sherer — 1,504,523 and E. J. Vogt — 1,852,598. More recent attempts have been directed at simplification of the fasteners and to take advantage of the basic structure for supporting purposes with examples of this art being found in the U.S. Pat. Nos. to: E. C. Streator — 3,101,923; Husted — 3,163,392, and D. F. Williams et al. — 3,628,762. Each of these devices had inherent limitations such as requiring secondary retaining elements, specialized fitments to be applied to the supporting structure as well as multiple pieces. Additionally, few of the devices shown in the cited art are capable of supporting high shear loads directly on the supporting panels since many of them are supported on a flexible member.

SUMMARY OF THE INVENTION

The present invention relates to a one piece device which has the unique ability of distributing high shear loads and torsional loads directly to the supporting panel structure.

Another object of the invention is to provide an economical one piece hand insertable fastener which is simple in construction but which overcomes the deficiencies of the prior art by wide distribution of stress forces commonly incurred in the applications involved.

A further object of the present invention is to provide a fastener which is compatible for usage with thin panels which are backed by a foamed insulation material and which are capable of displacing the foamed material in such a fashion that the fastener will be permanently seated without the use of any secondary preparation by the operator.

Still another object of the present invention is to provide a prong configuration which is capable of being utilized with head configurations that would not be permissible with any of the prior art. The panel preparation is minimal in that a non-circular aperture is provided having a large upper portion interconnected by a communicating slot to thereby provide one or more shoulders adjacent the slot for distribution of sheer loads through adequate shoulder means in the fastener per se.

Other objects of the invention will become apparent to those skilled in the art when the specification is read in conjunction with the drawings.

BRIEF DESCRIPTION OF THE DRAWINGS

FIG. 1 is a perspective view of one embodiment of the present invention;

FIGS. 2, 4, 6 and 8 are side elevational views in partial section showing the various stages of installation of the embodiment shown in FIG. 1;

FIGS. 3, 5, 7 and 9 are front elevational views in partial section taken along lines 3—3 in FIG. 2; lines 5—5 in FIG. 4; lines 7—7 in FIG. 6; and lines 9—9 in FIG. 8, respectively;

FIG. 10 is a perspective view of a second embodiment of the present invention;

FIGS. 11 and 12 are side elevational views in partial section of the second embodiment showing stages of installation into a foam backed panel with a tape sealed hole; FIG. 11a is a front elevational view in partial section taken along lines 11a—11a in FIG. 11 showing the clearing of tape and foam by the wedge shaped nose of the pronglike stud and the chisel point for cleaning the slot;

FIG. 13 is a side elevational view in partial section of a third embodiment of the present invention;

FIG. 14 is a bottom view of the third embodiment shown in FIG. 13;

FIG. 15 is a front elevational view in partial section taken along line 15—15 of FIG. 13;

FIGS. 16 through 20 are elevational views of panel apertures which would be compatible with embodiments of the present invention;

FIG. 21 is an additional embodiment of a head support means useable with the present stud invention.

FIG. 22 is a perspective view of a fourth embodiment of the stud of the present invention; and FIGS. 23 through 25 are side elevational views of various stages of installation of the fourth embodiment of the invention shown in FIG. 21.

Referring now to the drawings where similar parts are identified by similar numerals, the fastener 10 includes a head 12, a stud 14, and a support means 16 extending from the head 12 in a direction opposite to that of the stud 14.

The head 12 in this embodiment is a flat planar member having a rear surface 20 which serves as a reference, for purposes best set forth hereinafter. It will be recognized that the rear surface 20 could include, although not shown, a thin sealing flange or a series of protuberances arranged in such a fashion as to also serve as a reference for contacting the support with which it is associated.

The stud 14 includes a substantially rigid curved hook-like member 24 which is integrally connected to the head 12 and extends outwardly and is thence reversely bent toward said rear surface 20 with the free end of said hook-like stud extending beyond an edge margin of said base and terminating in spaced relation to said reference, for purposes best set forth hereinafter. The hook-like member, for economies in manufacture, generally is defined by a pair of ribs with the outer rib 26 defining a convex surface while the inner rib 28 defines a concave surface with the ribs 26 and 28 being joined by a central web 27 and terminate in a rounded nose or free end 30. The hook-like member 24 has substantial width which is preferably less than the width of the head 12 and terminates adjacent the rear surface 20 in a solid section 32 forming a rigid shoulder means adjacent rear surface 20 capable of carrying substantial shear loads. Extending integrally from the outer rib 26 in a curved fashion towards the rear surface 20 is a resilient retaining arm 40 which is narrower than stud 24 and terminates in spaced relation to the back surface 20 with a cammed shouldered end 42.

In this present embodiment the head 12 is provided on its front surface with a support means 16 in the form of a hook-like element 50 for accepting a secondary element such as a wire shelf, although many various forms of support, not shown, could be carried by head 12.

The fastener 10 described above is capable of being utilized with a thin support panel 60 having a non-circular aperture 62. The aperture 62 in the preferred embodiment has a large upper portion 64 and a lower communicating slot 66, with the margins of the aperture adjacent its juncture with the slot 66 forming at least one supporting shoulder means 68. The width of the upper portion 64 is substantially equal to the width of the hook-like portion 24 while the slot 66 is substantially equal in width to the resilient arm 40.

Referring now to FIGS. 2 through 9, the operation of the fastener is such that the rounded nose 30 is introduced in the upper portion 64 of aperture 62 by lateral telescoping through panel 60 and then rocked or rotated with the trailing resilient arm 40 moving within the slot portion 66 of aperture 62. As the fastener is rotated into the hole the flexible arm 40 is deflected until its tip 42 contacts the rear surface 20, as seen in FIG. 6. The rotation of the fastener is continued until it is seated with the rear surface 20 in contact with the panel 60 in overlying relationship to aperture 62. To accomplish this the flexible arm 40 must slide along the rear surface 20 in the direction of the arrow "A" and must bow in the direction of the arrow "B", as best seen in FIG. 6. When the head is finally seated on the panel 60, as seen in FIG. 8, the rounded free end 30 of the hook-like member 24 is in contact with the rear or left side of panel 60, as seen in the drawing. The hook-like prong or stud 14 provides resistance to torsional loads induced by forces applied to support 16 by distributing the forces over a large area of the panel 60 while the solid section or shoulder portion 32, under the head fills the upper portion 64 and rests on the shoulder 68, as best seen in FIG. 9, to provide high resistance to shear loads. The flexible arm 40 with its cammed end 42 engages the lower edge of the slot portion 66 and resists unintentional retrograde rotation or removal of the fastener. If it is desired to remove the fastener a thin sheet-like element can be forced behind the rear surface 20 of the head 12 and by engaging the flexible arm 40 the fastener can be removed. It is important to note, however, that no loads are carried by the flexible arm 40 and hence all weight is carried in shear and in torsion by the hook-like stud portion 24 and its solid shoulder 32. Of course it should be recognized that the thickness and width of the hook-like portion 24 and the flexible arm 40 can be suitably tapered to provide ease in introduction within the aperture 62.

The embodiment described hereinabove along with all of the other embodiments can be readily manufactured from available thermoplastic materials by injection molding techniques known in the art. The configuration of the prong is such as to provide rigid characteristics for resistance of torsional and shear loads while the same material, as an integral part of the entire fastener, when reduced in section will provide a resilience to the arm 40 as well as some resilience to the hook-like supporting means 16 for introduction of a wire-like shelf means 70, as seen in section in FIG. 8.

Referring now to FIGS. 10 through 12, a second embodiment of the present invention is shown which is adapted for use with an apertured support panel that is backed by a foamed in place material, with the aperture being taped to prevent the foam from escaping through the aperture during the foaming operation. In the refrigeration industry is has been found highly desirable to utilize an inner and outer body shell for forming the inner and outer walls of the refrigerator or freezer cabinet. A liquid material is pumped into the recess between the two boxes and with selected additives can be foamed in place to form the insulating material. A common problem is to provide means for fastening devices within the interior of the refrigerating apparatus and further to provide a common inner liner for all of the different models that a manufacturer may wish to provide. The most common expedient is to provide an inner liner having all of the same apertures and with all of the apertures being utilized in the luxury model while in the more economical models certain of them may be blocked by suitable hole-plug means.

The present embodiment is adapted to be used in such application and also eliminates the necessity of special preparation of the liner for acceptance of a supporting or fastening means. In this second embodiment the hook-like stud 24a is tapered at its free end to form a wedge-shaped nose 30a which is capable of splitting or cutting the foam as the part is rotated into its final mounted position. It further prevents bunching of the foam ahead of the nose by moving it laterally. Extending tangentially from outer convex rib 26a is a chisel point 80 having the same general width as flexible arm 40a, The chisel point 80 is adapted to break or cut the tape 82 on the backside of panel 60a and to clear the foam insulation 84 from the slot 66a of the aperture 62a. This permits reliable engagement of the flexible arm 40a when the fastener is firmly seated in mounted position with the rigid shoulder 32a seated within the aperture 62a, the free end or nose 30a is in engagement with the backside of panel 60a and the resilient arm 40a seated at the base of slot 66a. As can be seen in FIGS. 11 and 12, the fastener will cut and wedge the foam out of position to provide easy access for manual insertion within a foam-backed panel. The embodiment shown in FIGS. 11 and 12 display the same type of hook-like support 16a as shown in the first embodiment while FIG. 10 shows a flat head which is capable of use as a hole plug where certain holes are to be esthetically covered and not used in a particular economy model of the refrigeration apparatus.

Referring now to FIGS. 13 through 15, it has been found that certain devices of the type described hereinabove cannot be utilized when the parts are provided with special head sections of the type shown in FIG. 13 where there is a need for a lower insertion angle due to sidewall clearance problems. In this embodiment the support means 16b includes a substantial cylindrical shaped element 90 extending laterally from the head 12b and is further provided with a pair of upright flexible flange elements 92 and 94 for acceptance of a flat rectangular element forming a portion or side rail of a shelf 96, shown in phantom, in FIG. 13. It should be recognized of course that the shelf 96 would not be inserted until the fastener 10b is in final mounted position.

To accommodate the upstanding flange 24 and the lower entry angle during installation the outer rib 24b is thinned in width to substantially the same width as the flexible arm 40b whereby the rib 24b will be acceptable within the slot 66b of the aperture 62b. As the rib 24b approaches the back surface 20b of head 12b it tapers outwardly to substantially the full width of the upper aperture portion 64b to form the shear resisting shoulder 32b. Thus, this embodiment illustrates a device which is capable of having a shallower entry angle through accommodation of rib 24b in the slot 66b to thereby permit devices having laterally extending portions such as snap flange 94 to utilize the stud concept of the present invention.

As has been previously described the panel hole preparation can contemplate a broad variety of configurations each of which would envisage at least one shoulder means with the cross section of the prong 24 configuration being compatible and cooperative with the configuration of the upper portion 64 of the aperture 62. In FIG. 16 there is shown a rectangular or square aperture having a communicating slot of the form shown in the three previous embodiments. In FIg. 17 the upper portion is substantially in the configuration of a circle with a communicating slot extending downwardly therefrom to accept a resilient retaining arm. FIGS. 18 and 19 show the use of a triangular upper portion both in normal and in inverted form. FIG. 20 shows a bow tie or keyhole configuration in which the hook-like stud portion 24 would be seated within the lateral slots and the resilient element positioned internally of the central cylindrical portion, as shown generally in phantom. The purpose of showing these various hole configurations is to indicate the versatility of the configurations available in applying the teachings of the present invention. Other geometric forms will be apparent to those skilled in the art. Each of the holes shown provides a supporting shoulder, 68c–68f, and a communicating slot, 66c–66f.

FIG. 21 is a further illustrative example of the type of embodiment shown in FIGS. 13 through 15, where a low entry angle is required. In this embodiment the stud 14b has a thinned outer rib 24b to permit it access, at least initially, within the slot portion of the aperture. In this embodiment the head 12b is an elongated element capable of supporting two laterally spaced arms 100 and 102 which are suitably reinforced by a central web 104 and a lower web 106. To assist against lateral dislodgement of the head 12b it is provided at one end with a detent 108 for acceptance within a secondary round aperture in the supporting panel 60b. This embodiment is an illustration of still another support means configuration that can be associated with the stud fastening concept presented by this invention.

It should be noted that the head 12, in conjunction with any of the various prong embodiments, could include a dovetailed, grooved or lipped exposed configuration, not shown, which would be adapted to accept various support designs equipped with a mating base for cooperation with the configuration of head 12 to mount the support relative to the panel. The head could further include means to accept a secondary fastener, such as a screw, not shown, for the purpose of removably retaining such supports relative to the head. It will be appreciated that such a cooperating configuration arrangement would provide economies in manufacture. A single stud and head mold cavity could be utilized with an infinite variety of support designs, thereby providing a customer with a single fastener which could accept various supports as demanded by the style of the particular refrigerator, freezer, etc., with which it is used.

I claim:

1. A one-piece plastic fastener in combination with a non-circular aperture in a panel, said fastener including a base adapted to cover said aperture and having rear surface means defining a reference for engaging the panel and support means on the opposite surface of said base adapted to engage secondary means, an integral substantially rigid curved hook-like stud which extends outwardly from a root portion adjacent the rear surface of said base and thence reversely bends toward said reference with the free end of said hook-like stud extending beyond an edge margin of said base and terminating in spaced relation to said reference a predetermined distance so that said base rear surface means contacts one surface of said panel while said free end will contact the opposite surface of said panel, said root of said stud having a cross-sectional configuration which at least at a plurality of points is complementary to said aperture and provides shoulder means adjacent to said base which in installed position engages in load bearing relationship walls of the panel forming said aperture so as to substantially prevent motion of said fastener in the plane of said panel, and resilient non-load bearing retaining means carried by said stud and cooperating with said aperture to prevent unintentional retrograde removal of said fastener from installed relation with said panel.

2. A fastener of the type claimed in claim 1 wherein said hook-like stud is tapered from its free end towards its juncture with the base.

3. A fastener of the type claimed in claim 2 wherein said hook-like stud is non-circular in cross-section.

4. A fastener of the type claimed in claim 1 wherein said hook-like stud includes a convex exterior surface facing away from said base and a concave recess facing said reference, said retaining arm connected to said convex surface intermediate its length and extending toward said base.

5. A fastener of the type claimed in claim 4 wherein the free end of said retaining means is spaced from said base a distance less than the thickness of said panel.

6. A fastener of the type claimed in claim 4 wherein the aperture in said panel includes an enlarged upper portion for accepting said rigid shoulder means of said hook-like stud in complementary loadbearing relation and a communicating slot of smaller size for accepting said retaining arm.

7. A fastener of the type claimed in claim 6 wherein the curved free end of said hook-like stud is wedge-shaped, said stud further including a generally rectilinear chisel pointed portion extending tangentially from said convex surface in the same general direction as the free end of said stud and said chisel portion having a width not greater than said slot.

8. A fastener of the type claimed in claim 6 wherein the aperture in said panel is generally T-shaped.

9. A fastener of the type claimed in claim 8 wherein the T-shaped aperture includes a thickened cross-bar and an abbreviated tail in the T-shape.

10. A fastener of the type claimed in claim 6 wherein the upper portion of the aperture is curvilinear and communicates with a rectilinear slot.

11. A fastener of the type claimed in claim 6 wherein the upper portion of the aperture is trapezoidal.

12. A fastener of the type claimed in claim 6 wherein the upper portion of the aperture is substantially triangular.

13. A fastener of the type claimed in claim 1 wherein said hook-like stud has a cross-section at least in the vicinity of its rigid shoulder means which is generally bow-tie in configuration with said aperture being complimentary thereto.

14. A fastener of the type claimed in claim 7 wherein said aperture is taped and said panel is backed with foamed cellular plastic material, said chisel point being adapted to break the tape and clear the foam from said aperture slot for ready acceptance of said retaining arm while said wedge-shaped free end splits the foam for insertion of said fastener stud behind said panel.

15. A fastener of the type claimed in claim 1 wherein the means on the opposite surface of said base adapted to engage secondary means includes a laterally extending support.

16. A fastener of the type claimed in claim 15 wherein the support includes a cylindrical support.

17. A fastener of the type claimed in claim 15 wherein the lateral support includes flange and latch means for restricting movement of the secondary means supported thereon.

18. A fastener of the type claimed in claim 16 wherein the support includes a resilient hook-like clip for accepting and restraining a transverse rod-like portion of said secondary means.

19. A fastener of the type claimed in claim 6 wherein the hook-like stud is wider along the concave surface than the convex surface, said convex surface having a width through a substantial portion of its length that is compatible for acceptance within the laterally communicating slot to thereby reduce the entry angle of the stud during installation into said panel, said convex surface tapering outwardly in width adjacent said rigid shoulder means to substantially fill said aperture except for said slot which accommodates the retaining arm.

20. A fastener of the type claimed in claim 1 wherein the head includes means adapted to accept and cooperate with mating means on a secondary support means.

21. A fastener of the type claimed in claim 20 wherein the cooperating head and support means has a dovetail-like configuration.

22. A fastener of the type claimed in claim 20 wherein the cooperating head and support means has a tongue-and-groove-like configuration.

23. A fastener of the type claimed in claim 20 wherein the cooperating head and support means includes means for accepting a secondary fastener.

* * * * *